(12) United States Patent
Zhang et al.

(10) Patent No.: US 11,428,891 B2
(45) Date of Patent: Aug. 30, 2022

(54) LENS MODULE

(71) Applicant: AAC Optics Solutions Pte. Ltd., Singapore (SG)

(72) Inventors: Jin Zhang, Shenzhen (CN); Gang Li, Shenzhen (CN); Jiliang Lu, Shenzhen (CN); Linzhen Li, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 168 days.

(21) Appl. No.: 16/916,146

(22) Filed: Jun. 30, 2020

(65) Prior Publication Data
US 2020/0409168 A1 Dec. 31, 2020

(30) Foreign Application Priority Data
Jun. 30, 2019 (WO) ................ PCT/CN2019/094059

(51) Int. Cl.
G02B 7/02 (2021.01)
G02B 7/09 (2021.01)
G02B 27/64 (2006.01)

(52) U.S. Cl.
CPC ................ G02B 7/02 (2013.01); G02B 7/09 (2013.01); G02B 27/646 (2013.01)

(58) Field of Classification Search
None
See application file for complete search history.

(56) References Cited

U.S. PATENT DOCUMENTS

2018/0031859 A1* 2/2018 Gomyo ................ G02B 7/09

FOREIGN PATENT DOCUMENTS

JP 2018077430 A1 5/2018

OTHER PUBLICATIONS

1st Office Action dated Apr. 26, 2021 by JPO in related Japanese Patent Application No. 2020-112573 (3 Pages).

* cited by examiner

Primary Examiner — Darryl J Collins
Assistant Examiner — Tamara Y. Washington
(74) Attorney, Agent, or Firm — W&G Law Group

(57) ABSTRACT

The present invention provides a lens module including a base, a lens holder, and a support assembly configured to support the lens holder. The lens holder is suspended in the base through the support assembly and includes at least two connecting portions configured to be fixedly connected to the support assembly. Each two connecting portion is provided with a groove, in which a buffering member is provided. The support assembly includes at least two support members, and each support member has one end connected to the groove of one connecting portion through the buffering member provided in the groove and the other end fixed to the base. The buffer can exerts a buffering function to buffer the support, and thus reduces or even avoids the shaking of the lens holder in a plane perpendicular to the optical axis of the lens.

14 Claims, 6 Drawing Sheets

LENS MODULE

TECHNICAL FIELD

The present invention relates to the technical field of lens optical imaging, and particularly, to a lens module.

BACKGROUND

In recent years, various portable smart terminals such as smartphones and tablet computers are equipped with high-performance lens modules. The high-performance lens module generally has an auto focusing (AF) function. The high-performance lens module needs to move a lens along an optical axis of the lens during auto focusing. In early designs of the applicant, the AF parts including lenses, lens holders, etc. are supported by using suspension wires, which suspend the AF parts in a base of the lens module by welding. However, such a support manner is limited by the performance of the suspension wires, and the AF parts may shake intensively in a horizontal direction, which affects an imaging quality of the lens.

Hence, it is urgent to provide an improved lens module to solve the above problems.

SUMMARY

A purpose of the present invention is to provide a lens module, which reduces shaking amplitude of the lens holder in a horizontal direction.

The technical solutions of the present invention are described as below.

A lens module includes a base, a lens holder, and a support assembly configured to support the lens holder. The lens holder is suspended in the base through the support assembly and comprises at least two connecting portions configured to be fixedly connected to the support assembly, each of the at least two connecting portions is provided with a groove, and a buffering member is provided in the groove. The support assembly comprises at least two support members, and each of the at least two support members has one end connected to the groove of one of the at least two connecting portions through the buffering member provided in the groove and the other end fixed to the base.

Further, the one end of the support member extends through the groove, the groove comprises a groove surface, the buffering member comprises a damping adhesive coated on the groove surface, and the damping adhesive covers a portion of the support member located in the groove.

Further, the at least two connecting portions comprise four connecting portions provided on four corner portions of the lens holder, respectively. The at least two support members comprise four support members, and the four support members are fixedly connected to the four connecting portions in one-to-one correspondence.

Further, the base comprises a substrate and a frame fixed on the substrate, the substrate and the frame together define a receiving space for receiving the lens holder. The frame has a square shape and comprises four side plates arranged along a periphery, a limit hole is defined between every two adjacent side plates of the fours side plates, and each of the four connecting portions of the lens holder is located in a corresponding limit hole.

Further, the lens holder further comprises a lens, a lens bracket in which the lens is to be mounted, and a pedestal for mounting the lens bracket. The pedestal comprises a square body in which the lens bracket is to be mounted, and the fours connecting portions, and each of the four connecting portion extends from a corresponding corner of the square body towards the limit hole of the frame and is suspended in the limit hole.

Further, the four connecting portions and the pedestal are formed into one piece.

Further, a conductive member is provided on each of the four connecting portions, and the one end of each of the at least two support members extending through the groove is fixedly and electrically connected to the conductive member.

Further, the lens module further includes a first circuit board mounted to the lens holder, and a second circuit mounted on a side of the substrate facing towards the lens holder. The other end of the support member is welded to the second circuit board, and the conductive member is electrically connected to the first circuit board.

Further, each of the at least two support members is a conductive suspension wire.

Further, the lens module further includes a housing. The base is installed in the housing.

The present invention has the following beneficial effects. The lens module is provided with a buffering member in the groove of the connecting portion, one end of the support member is connected to the groove through the buffering member, and the support member extends through the end of the groove and is fixedly connected to the connecting portion of the lens holder, so that the lens holder is supported, suspended and fixed in the base. When the lens holder shakes in a direction perpendicular to the optical axis of the lens, the buffering member exerts a buffering function to buffer the support, and thus reduces or even avoids the shaking of the lens holder in a plane perpendicular to the optical axis of the lens.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

REFERENCE SIGNS

Figure 1:
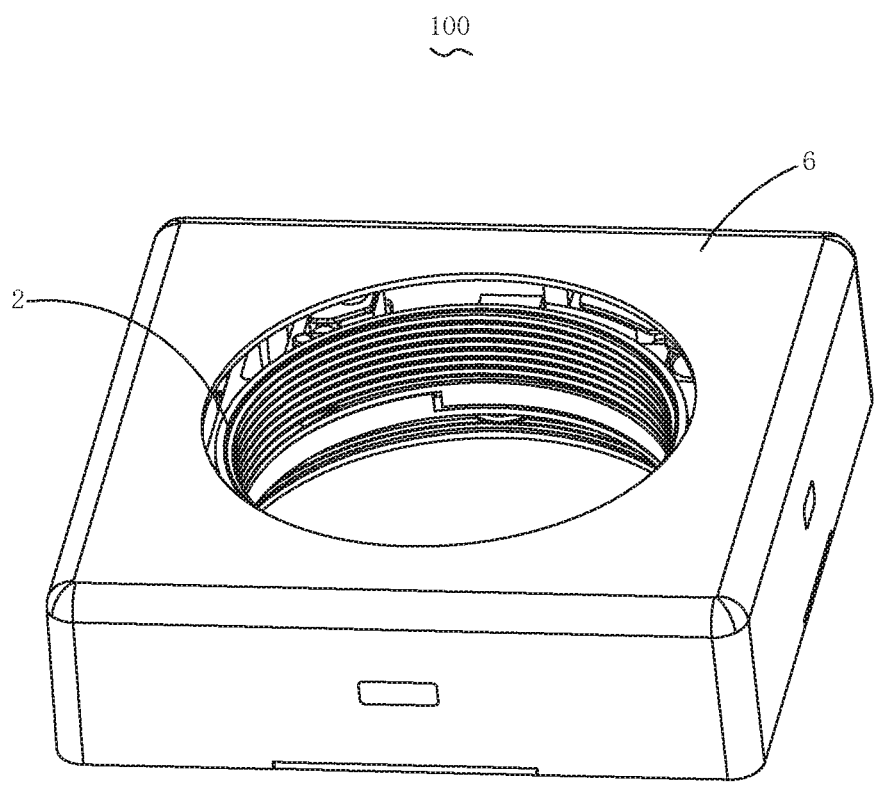
FIG. 1 is a three-dimensional schematic diagram of a lens module provided by an embodiment of the present invention.

100: lens module; 1: base; 11: substrate; 12: frame; 121: side plate; 122: limit hole; 2: lens holder; 21: lens bracket; 22: pedestal; 221: square body; 222: connecting portion; 223: groove; 224: groove surface; 3: support member/suspension wire; 31: first end; 32: second end; 4: drive assembly; 5: conductive member; 51: connection opening; 6: housing; 7: second circuit board; 8: buffering member/damping adhesive.

DESCRIPTION OF EMBODIMENTS

The present invention will be further described below with reference to the drawings and embodiments. As shown in FIGS. 1-9, an embodiment of the present invention provides a lens module 100 including a base 1, a lens holder 2, and a support assembly configured to support the lens holder 2. The lens holder 2 is suspended in the base 1 through the support assembly 1. The lens holder 2 includes a connecting portion 222 for fixedly connecting the support assembly, and the connecting portion 222 is provided with a groove 223, in which a buffering member 8 is provided. The support assembly includes at least two support members 3, and each of the support members 3 has one end connected to the groove 223 through a buffering member 8 and the other end fixed relative to the base 1. The lens module 100 further includes a drive assembly 4 installed between the base 1 and the lens holder 2 and configured to drive the lens holder 2 to displace in a direction perpendicular to an optical axis of the lens, thereby achieving lens anti-shake. The buffering member 8 is provided in the groove 223 of the connecting portion 222, and one end of the support member 3 is connected to the groove 223 through the buffering member 8, the support member 3 extends through the end of the groove 223 and is fixedly connected to the connecting portion 222 of the lens holder 2, such that the lens holder 2 is supported, suspended and fixed in the base 1. When the lens holder 2 shakes in the direction perpendicular to the optical axis of the lens, the buffering member 8 can effectively exert a buffering function on the support member 3 to reduce the shaking of the lens holder 2 in a plane perpendicular to the optical axis of the lens, thereby preventing the imaging quality from being affected by intensive shaking of the lens holder 2.

Figure 3:
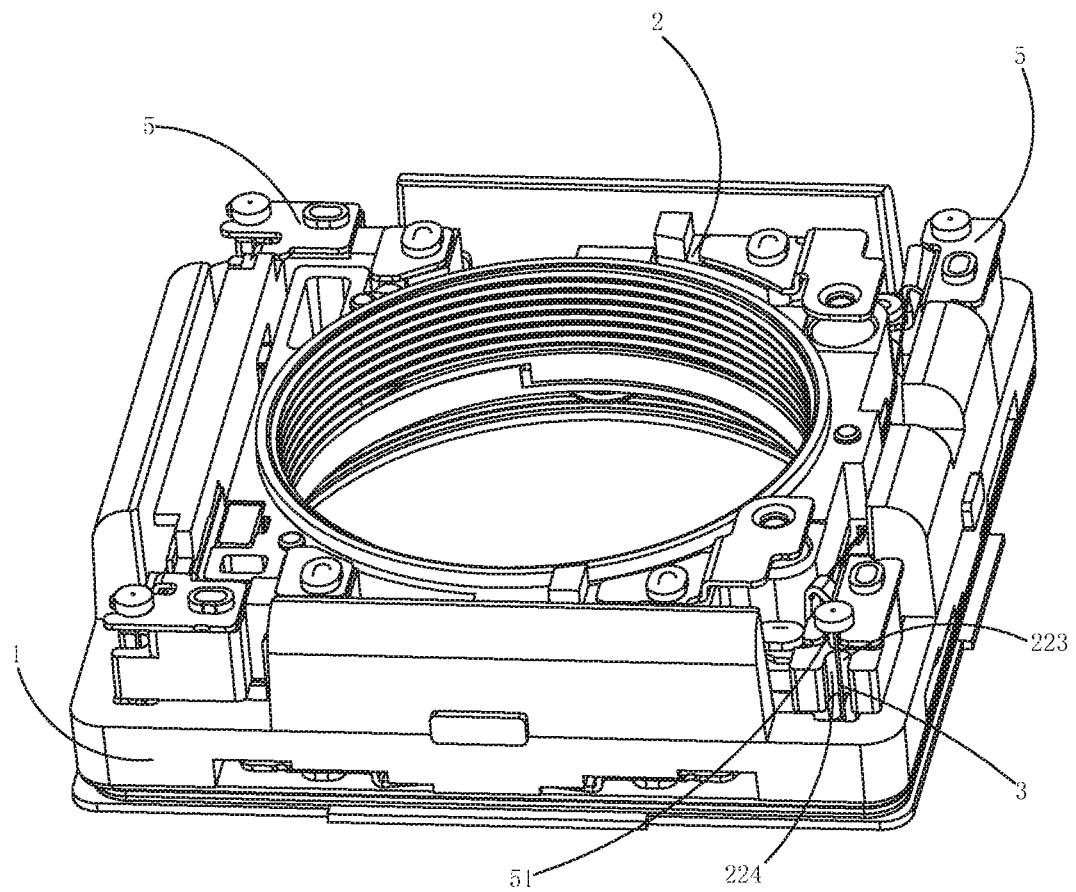
FIG. 3 is a three-dimensional schematic diagram of the lens module according to an embodiment of the present invention in absence a housing and buffering member.
Figure 4:
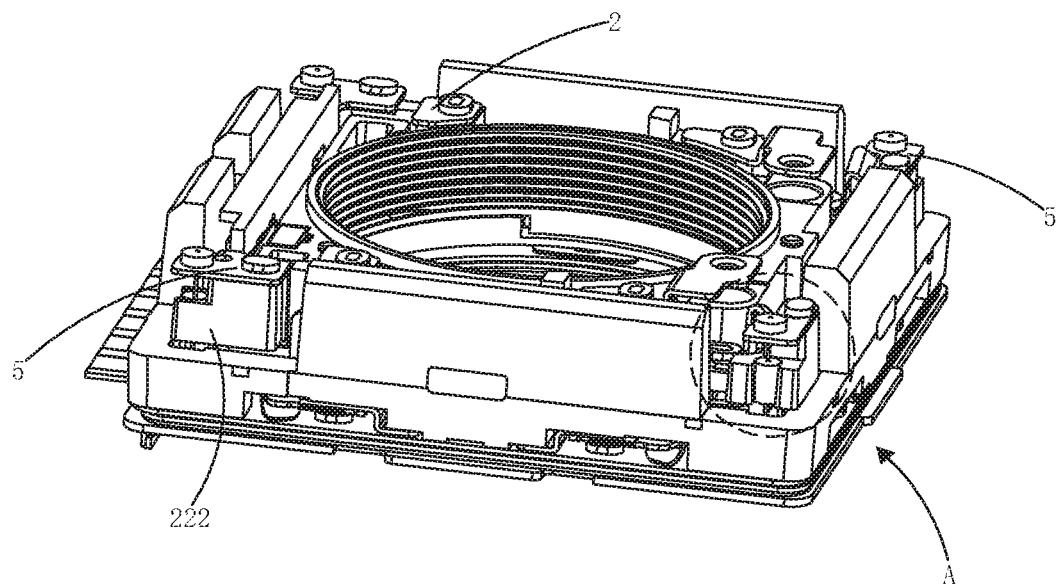
FIG. 4 is a three-dimensional schematic diagram of a lens module according to an embodiment of the present invention, in which a housing is removed and a buffering member is provided.
Figure 5:
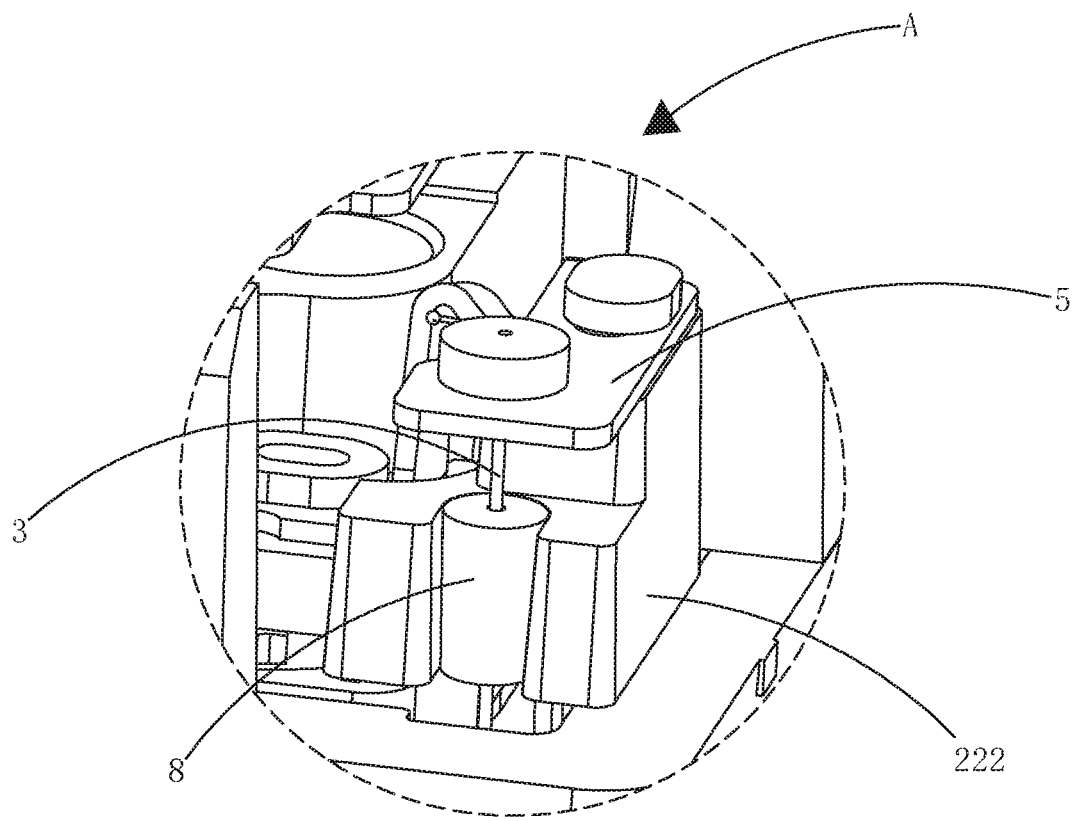
FIG. 5 is a partially enlarged view of a lens module at circle A in FIG. 4.
Figure 6:
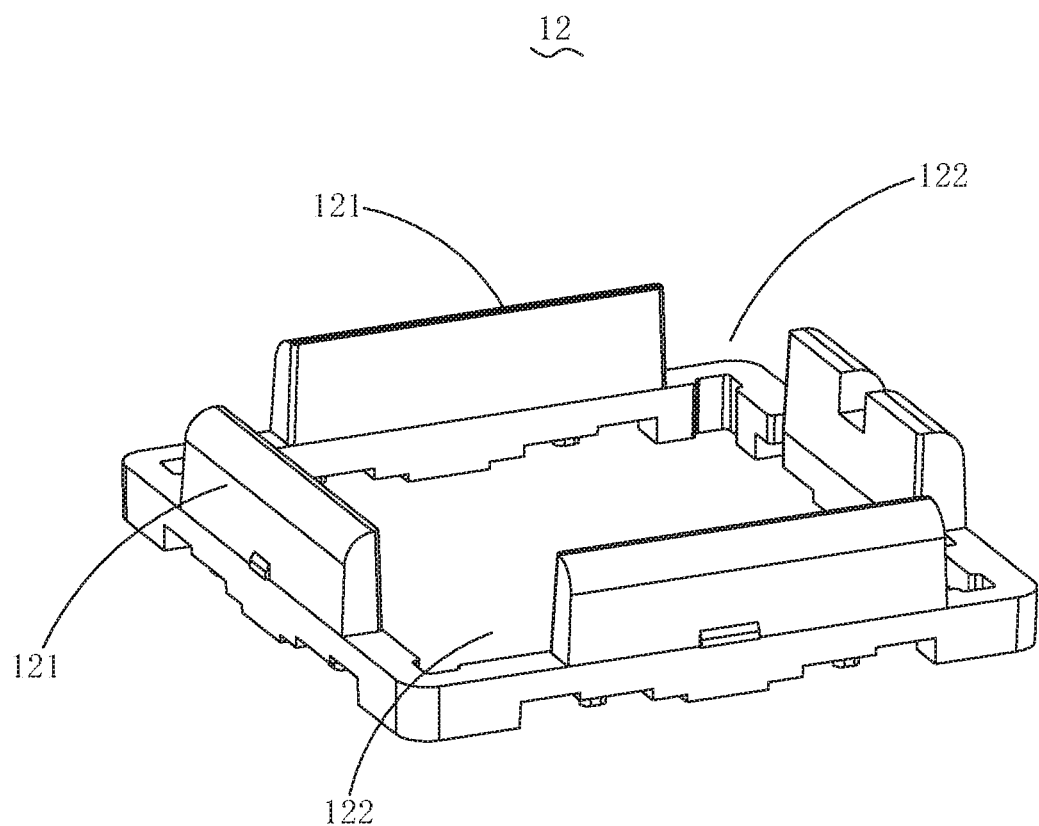
FIG. 6 is a three-dimensional schematic diagram of a frame provided by an embodiment of the present invention.
Figure 7:
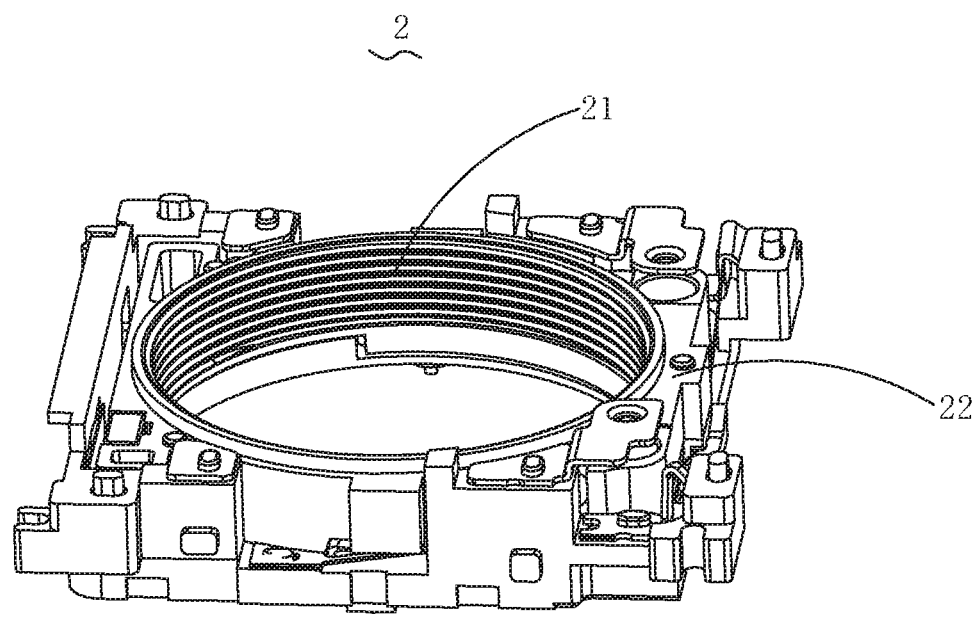
FIG. 7 is a three-dimensional schematic diagram of a lens holder provided by an embodiment of the present invention.
Figure 8:
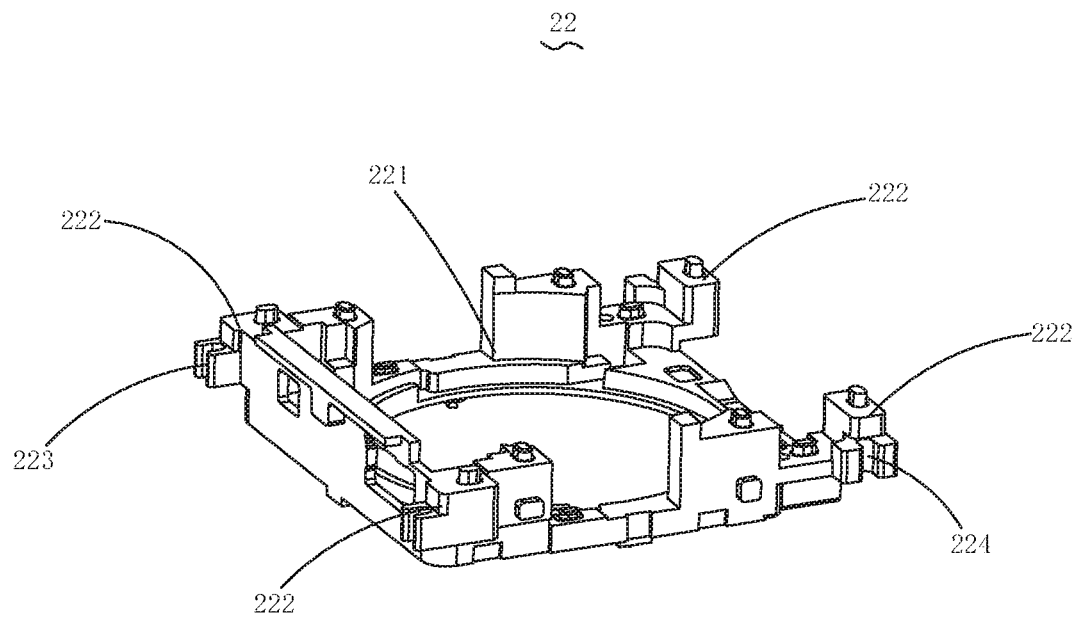
FIG. 8 is a three-dimensional schematic diagram of a base provided by an embodiment of the present invention.
Figure 9:
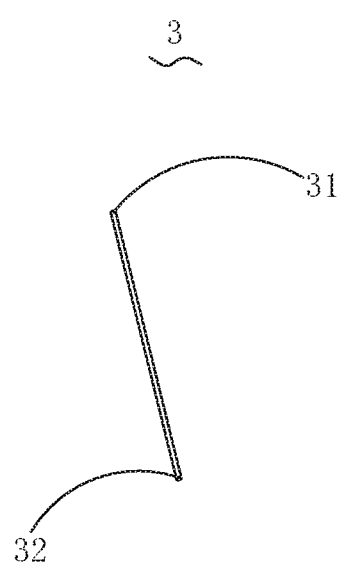
FIG. 9 is a three-dimensional structural schematic diagram of a suspension wire provided by an embodiment of the present invention.

Referring to FIGS. 3-5, one end of the support member 3 extends through the groove 223, and the groove 223 includes a groove surface 224. The buffering member 8 includes a damping adhesive 8 coated on the groove surface 224, and the damping adhesive 8 covers a portion of the support member 3 located in the groove 223. Since the damping adhesive 8 is coated on the entire groove surface 224 and the support member 3 extends through the groove 223, the damping adhesive 8 can cover the portion of the support member 3 located in the groove 223 to exert the buffering effect on the support member 3. It can be understood that the groove 223 may be provided as a closed through-hole (not shown), the support member 3 extends through the through-hole, and an inner surface of the through-hole is coated with the damping adhesive 8, which completely covers the portion of the support member 3 located in the through-hole.

For example, the lens holder 2 includes four corners, and a connecting portion 222 is provided on each corner. A number of the supporting members 3 is the same as that of the connecting portions 222, i.e., four supporting members 3 are provided, and each support member 3 is fixedly connected to the corresponding one connecting portion 222. Since the four corners of the lens holder 2 are each provided with the support members 3, the lens holder 2 is stably suspended in the base 1 and is prevented from tilting. In addition, each of the four corners is provided with the connecting portion 222 having the buffering member 8, which further enhances the buffering effect on the support assembly and reduces the shaking of the lens holder 2.

Referring to FIGS. 2 to 5, in this embodiment, the base 1 includes a substrate 11 and a frame 12 fixed on the substrate 11. The substrate 11 and the frame 12 together define a receiving space for receiving the lens holder 2. The frame 12 has a square shape and includes four side plates 121 arranged in a periphery thereof. A limit hole 122 is defined between every two adjacent side plates 121. Each connecting portion 222 of the lens holder 2 corresponds to the connection between adjacent side plates 121 and is located in a corresponding limit hole 122. The lens holder 2 further includes a lens (not shown), a lens bracket 21 for mounting the lens, and a pedestal 22 for mounting the lens bracket 21. The pedestal 22 includes a square body 221 for mounting the lens bracket 21, and the connecting portions 222. Each connecting portion 222 extends from a corresponding corner of the square body 221 towards the limit hole 122 of the frame 12 and is suspended in the limit hole 122. The connecting portions 222 and the pedestal 22 are formed into one piece, or they are separately formed and then assembled together. Each connecting portion 222 is partially suspended in the corresponding limit hole 122 to limit the displacement of the lens holder 2 towards the substrate 11 along a direction parallel to the optical axis of the lens.

Figure 2:
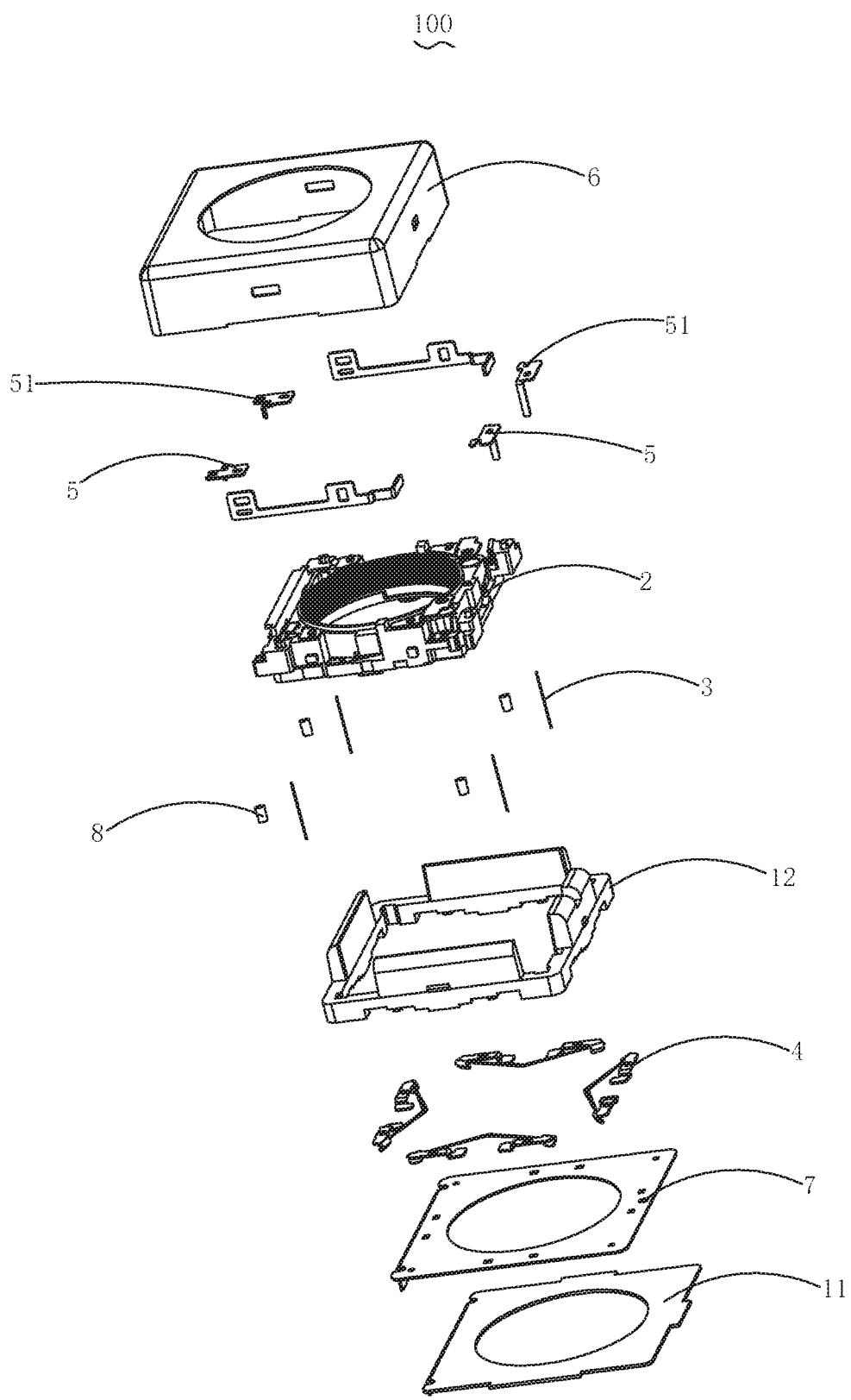
FIG. 2 is an exploded view of a lens module provided by an embodiment of the present invention.

For example, the lens module 100 further includes a first circuit board (not shown) mounted to the lens holder 2, and a second circuit board 7 mounted on a side of the substrate 11 facing towards the lens holder 2. The first circuit board is configured to supply power to a drive device of an auto focusing system of the lens module 100. The second circuit board 7 is connected to an external power supply and configured to supply power to the drive assembly 4 and the support assembly of the automatic anti-shake system of the lens module 100. The connecting portion 222 of the lens holder 2 is provided with a conductive member 5, and the conductive member 5 is electrically connected to the first circuit board through an electrical connection element. The end of the support member 3 extending through the groove 223 is fixedly connected (e.g., welded) to the conductive member 5 to form a mechanical and electrical connection between the support member 3 and the conductive member 5, and the other end of the support member 3 is welded to the second circuit board 7 to form a mechanical and electrical connection between the support member 3 and the second circuit board 7. The conductive member 5 includes a connection opening 51 that directly opposite to the groove 223, and the end of the support member 3 extending through the groove 223 is welded to the conductive member 5 through the connection opening 51 to form an electrical connection. The connection opening 51 may be a closed round hole, or a recess with an opening. The connection opening 51 of the conductive member 5 shown in in FIGS. 2 and 3 is the recess with an opening, while the connection opening 51 of the conductive member 5 shown in FIGS. 4 and 5 is the closed round hole. In the present embodiment, the support member 3 is a conductive suspension wire 3 including a first end 31 and a second end 32. The first end 31 extends through the groove 223 to be fixedly connected to the conductive member 5 on the connecting portion 222, and the second end 32 is welded and fixed to the second circuit board 7 and thus is electrically connected to the second circuit board 7, thereby electrically connecting the conductive member 5 to the second circuit board 7. The suspension wire 3 may be made of conductive metals such as copper-nickel-tin alloy, which have high support strength and good conductivity. Due to the high support strength of the suspension wire 3, the lens holder 2 can be fixedly and stably suspended in the base 1. Therefore, the support assembly can not only support the lens holder 2 but also conduct electricity.

For example, the lens module 100 further includes a housing 6 sleeved on the base 1. The housing 6 is configured to provide protection and dust-prevention to the entire lens module 100, i.e., to prevent dust from entering the lens module 100 and protect the components inside the housing 6 from being damaged.

The above are only the preferred embodiments of the present invention. It should be understood that the modifications made by those skilled in the art without departing from the concept of the present invention shall fall within the protection scope of the present invention.

What is claimed is:

1. A lens module, comprising:
   a base,
   a lens holder, and
   a support assembly configured to support the lens holder,
   wherein the lens holder is suspended in the base through the support assembly and comprises at least two connecting portions configured to be fixedly connected to the support assembly, each of the at least two connecting portions is provided with a groove, and a buffering member is provided in the groove, and
   wherein the support assembly comprises at least two support members, and each of the at least two support members has one end connected to the groove of one of the at least two connecting portions through the buffering member provided in the groove and the other end fixed to the base;
   wherein the one end of the support member extends through the groove, the groove comprises a groove surface, the buffering member comprises a damping adhesive coated on the groove surface, and the damping adhesive covers a portion of the support member located in the groove;
   wherein the at least two connecting portions comprise four connecting portions provided on four corner portions of the lens holder, respectively, and
   wherein the at least two support members comprise four support members, and the four support members are fixedly connected to the four connecting portions in one-to-one correspondence.

2. The lens module as described in claim 1, wherein the base comprises a substrate and a frame fixed on the substrate, the substrate and the frame together define a receiving space for receiving the lens holder, and wherein the frame has a square shape and comprises four side plates arranged along a periphery, a limit hole is defined between every two adjacent side plates of the fours side plates, and each of the four connecting portions of the lens holder is located in a corresponding limit hole.

3. The lens module as described in claim 2, wherein the lens holder further comprises a lens, a lens bracket in which the lens is to be mounted, and a pedestal for mounting the lens bracket,
   wherein the pedestal comprises a square body in which the lens bracket is to be mounted, and the fours connecting portions, and each of the four connecting portion extends from a corresponding corner of the square body towards the limit hole of the frame and is suspended in the limit hole.

4. The lens module as described in claim 3, wherein the four connecting portions and the pedestal are formed into one piece.

5. The lens module as described in claim 3, further comprising a housing, wherein the base is installed in the housing.

6. The lens module as described claim 2, wherein a conductive member is provided on each of the four connecting portions, and the one end of each of the at least two support members extending through the groove is fixedly and electrically connected to the conductive member.

7. The lens module as described in claim 6, further comprising a first circuit board mounted to the lens holder, and a second circuit mounted on a side of the substrate facing towards the lens holder,
   wherein the other end of the support member is welded to the second circuit board, and the conductive member is electrically connected to the first circuit board.

8. The lens module as described in claim 7, further comprising a housing, wherein the base is installed in the housing.

9. The lens module as described in claim 6, further comprising a housing, wherein the base is installed in the housing.

10. The lens module as described in claim 2, further comprising a housing, wherein the base is installed in the housing.

11. The lens module as described in claim 1, wherein each of the at least two support members is a conductive suspension wire.

12. The lens module as described in claim 11, further comprising a housing, wherein the base is installed in the housing.

13. The lens module as described in claim 1, further comprising a housing, wherein the base is installed in the housing.

14. The lens module as described in claim 1, further comprising a housing, wherein the base is installed in the housing.

* * * * *